(12) United States Patent
Yang

(10) Patent No.: US 6,522,372 B2
(45) Date of Patent: Feb. 18, 2003

(54) LIQUID CRYSTAL DISPLAY MONITOR HAVING SIMPLIFIED ASSEMBLY PROCESS

(75) Inventor: Dong-Wook Yang, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 10/080,621

(22) Filed: Feb. 25, 2002

(65) Prior Publication Data

US 2002/0171783 A1 Nov. 21, 2002

(30) Foreign Application Priority Data

May 21, 2001 (KR) ........................................ 2001-27811

(51) Int. Cl.$^7$ ............................................. G02F 1/1336
(52) U.S. Cl. ......................................................... 349/58
(58) Field of Search ............................... 349/58; 361/681

(56) References Cited

U.S. PATENT DOCUMENTS 5,568,357 A * 10/1996 Kochis ........................ 349/58
6,188,380 B1 * 2/2001 Kawashima et al. .......... 349/58
6,330,150 B1 * 12/2001 Kim ............................. 349/58

* cited by examiner

Primary Examiner—James Dudek
Assistant Examiner—Ruth Graden
(74) Attorney, Agent, or Firm—Robert E. Bushnell, Esq.

(57) ABSTRACT

A liquid crystal display (LCD) monitor comprises: a front casing; an LCD assembly combined with or joined to the rear of the front casing; a printed circuit board (PCB) assembly transmitting electrical signals to the LCD assembly; and a support including an LCD support part combined with or joined to the front casing and positioned at the rear of the LCD assembly against the front casing, and a board accommodating part integrated with the LCD support part in a single body and accommodating the PCB assembly therein. With this configuration, the present invention simplifies the assembly process and reduces the cost of production by reducing the components thereof.

20 Claims, 5 Drawing Sheets

LIQUID CRYSTAL DISPLAY MONITOR HAVING SIMPLIFIED ASSEMBLY PROCESS

CLAIM OF PRIORITY

This application makes reference to, incorporates the same herein, and claims all benefits accruing under 35 U.S.C. §119 from my application LCD MONITOR filed with the Korean Industrial Property Office on May 21, 2001 and there duly assigned Ser. No. 2001-27811.

BACKGROUND OF THE INVENTION

1. Field of the Invention

The present invention relates, in general, to a liquid crystal display (LCD) monitor. More particularly, it relates to an LCD monitor having an improved structure combining an LCD assembly and a printed circuit board (PCB) assembly.

2. Description of the Related Art

An LCD monitor is a display apparatus using the phenomenon that, when a certain voltage is applied, the arrangement of a liquid crystal is varied to prevent light from passing therethrough.

The LCD monitor has the advantages of space utility because of its small size and low power consumption, so that the LCD monitor is preferred by many users. However, most users cannot easily afford the LCD monitor due to its high price.

Therefore, technology for reducing the cost of the LCD monitor has been developed. For example, reduced cost is achieved by reducing the number of components thereof or by improving the production steps thereof.

An LCD monitor comprises a cover casing forming an outer appearance thereof, an LCD assembly accommodated in the cover casing, and a PCB assembly for transmitting electric signals to the LCD assembly.

The cover casing comprises a front casing and a rear casing which are combined with or joined to each other to form a space for accommodating the components, including the LCD assembly, the PCB assembly, etc. An opening is provided in the front casing, through which opening pictures displayed on an LCD panel are transmitted to the outside of the LCD monitor. Air inflow slots and terminal accommodating holes are provided in the rear casing.

The LCD assembly comprises an LCD panel on which pictures are displayed, and an LCD support frame which is combined with or joined to the circumference of the LCD panel. Screw combining holes are provided at the left and right sides of the LCD support frame in order to join or combine the LCD assembly with a panel support.

The panel support for fixing a position of the LCD assembly, and a PCB shield for protecting the PCB assembly and fixing a position of the PCB assembly, are accommodated between the front casing and the rear casing.

The panel support is made of a metal board for surrounding the rear surface and circumference of the LCD assembly. A plurality of combining flaps is provided at the circumference of the panel support for joinder or combination with the rear surface of the front casing. Screw passing holes are formed in the combining flaps. The LCD assembly is accommodated in the panel support and is combined with or joined to the panel support by screws. The panel support combined with the LCD assembly is also combined with or joined to the rear surface of the front casing by a plurality of screws.

The PCB shield is made of a metal board for accommodating the PCB assembly. A plurality of flanges is provided at the circumference of the PCB shield, and screw passing holes are formed therein. The PCB assembly is fixed to the rear surface of the panel support by screws. The PCB shield is combined with or joined to the rear surface of the panel support by a plurality of screws and covers the PCB assembly.

However, because the panel support and the PCB shield of the LCD monitor are separately provided components and are assembled using a plurality of screws, the assembly process is complicated and the cost of production is increased.

SUMMARY OF THE INVENTION

Accordingly, the present invention has been developed with the above-described shortcoming and the needs of the user in mind. An object of the present invention is to provide an LCD monitor which is capable of simplifying the assembly process and reducing the cost of production by reducing the components thereof.

This and other objects of the present invention are accomplished by the provision of an LCD monitor comprising a front casing, an LCD assembly combined with or joined to the rear of the front casing, and a PCB assembly for transmitting electrical signals to the LCD assembly. The LCD monitor further comprises a support comprising an LCD support part combined with or joined to the front casing and disposed at the rear of the LCD assembly for pressing the LCD assembly against the front casing, and a board accommodating part integrated with the LCD support part in one body and accommodating the PCB assembly therein.

Preferably, the board accommodating part is formed so as to protrude rearwardly inside the LCD support part. At least one input port is provided at the circumference of the PCB assembly, and a port passing opening is formed at a certain area of the board accommodating part corresponding to the input port.

For the sake of efficiency, the LCD monitor support comprises a bent flange adjacent to at least one side of the LCD assembly and preventing the LCD assembly from moving out of the support. A plurality of casing combining flaps having screw passing holes is provided in the bent flange, and screw coupling parts are provided at a part of the front casing corresponding to the casing combining flaps.

Further, at least one stopping projection is provided in either the circumference of the LCD assembly or that of the front casing and projects toward the other one of the two, while a stopping groove is provided at the other one of the two in correspondence to the stopping projection.

Preferably, the LCD monitor comprises a rear casing forming, in cooperation with the front casing, a space for accommodating the LCD assembly, the PCB assembly and the support therein, and at least one pressing projection is joined to one of the LCD assembly and the rear casing, and presses the LCD assembly against the front casing.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference numerals indicate the same or similar components, and wherein.

DETAILED DESCRIPTION OF THE PREFERRED EMBODIMENT

A preferred embodiment of the present invention will be described in more detail with reference to the accompanying drawings.

Figure 1:
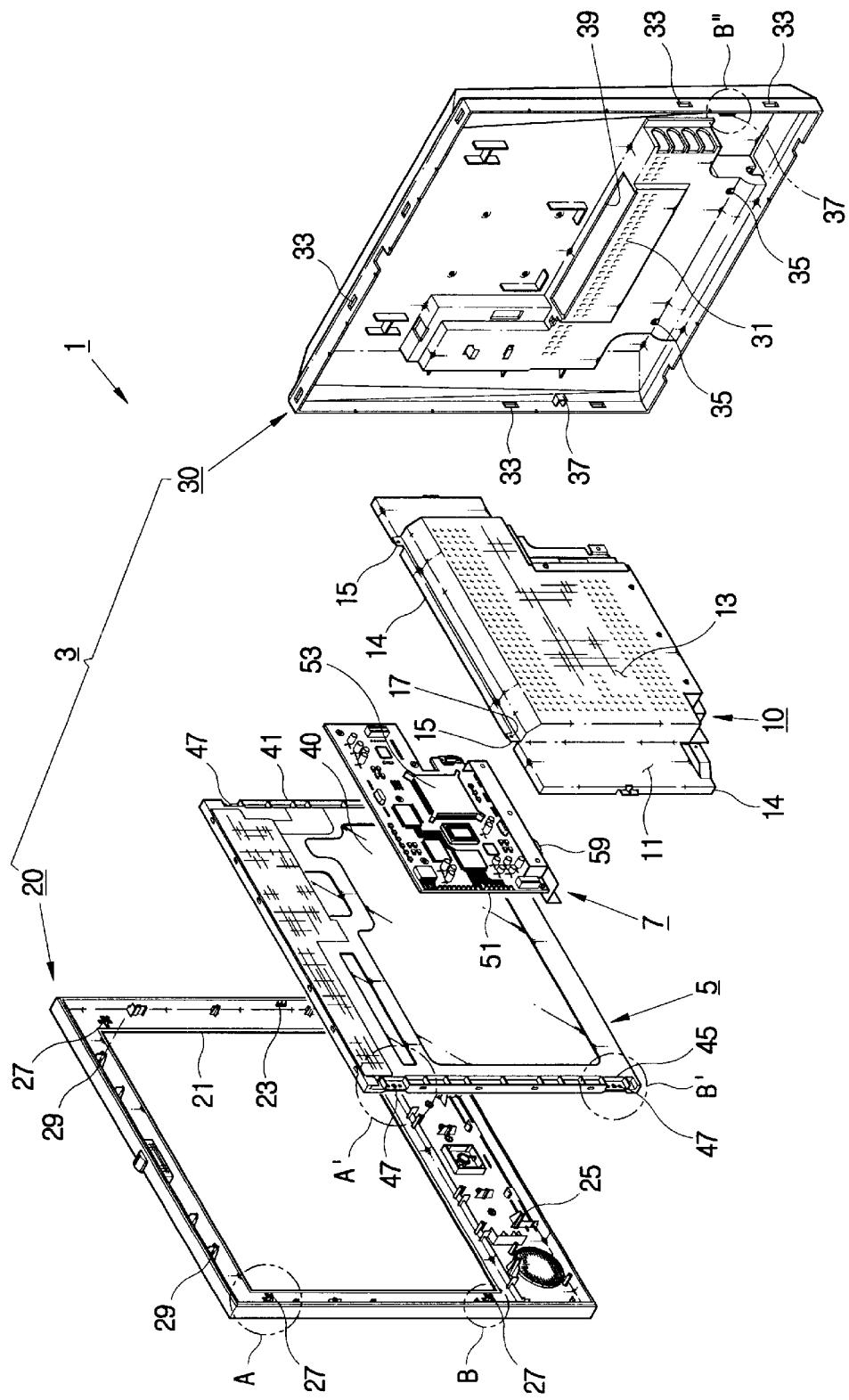
FIG. 1 is an exploded perspective view of an LCD monitor according to the present invention.
Figure 2:
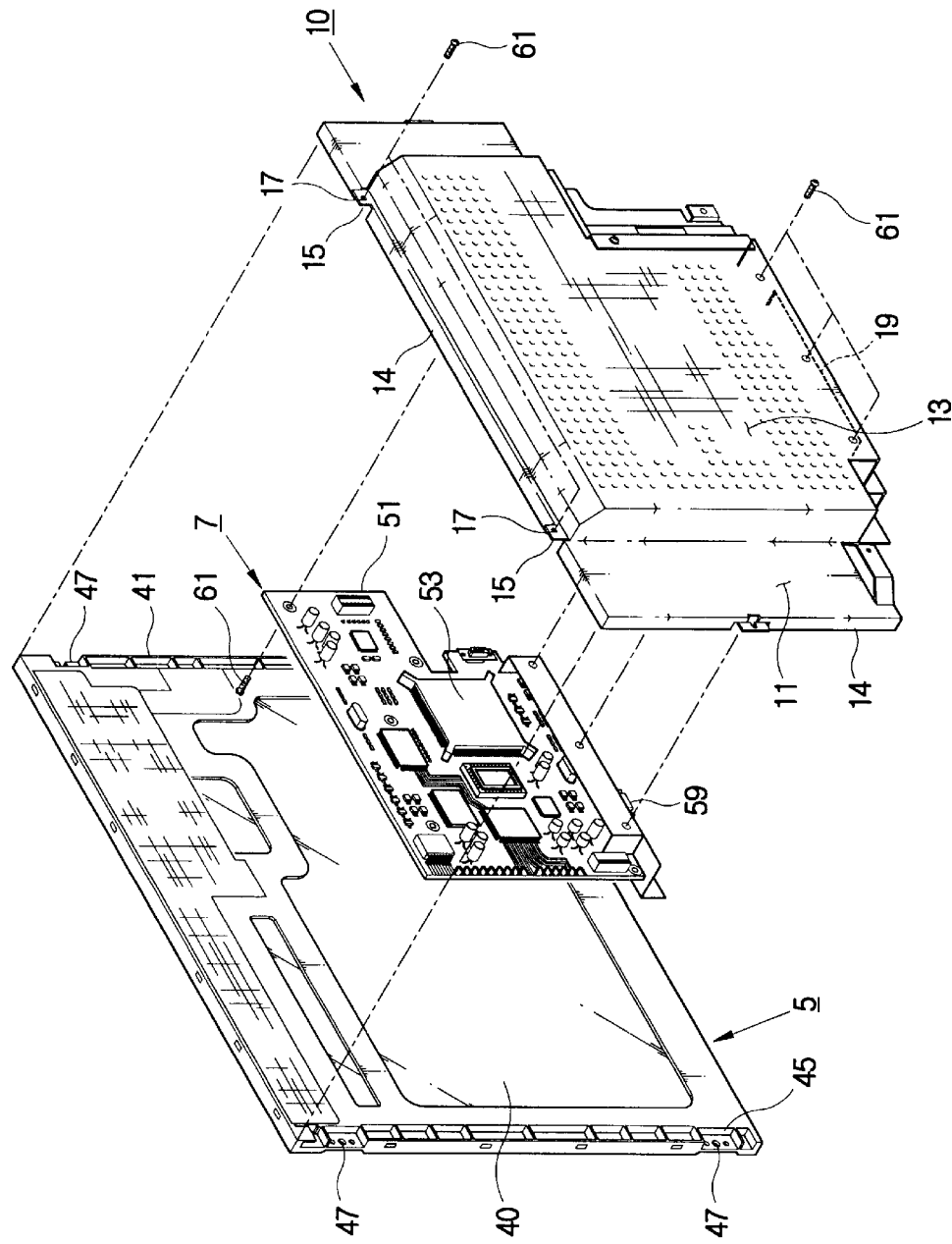
FIG. 2 is an exploded perspective view of an LCD assembly, a PCB assembly, and a support as seen in FIG. 1.

FIG. 1 is an exploded perspective view of an LCD monitor according to the present invention, while FIG. 2 is an exploded perspective view of an LCD assembly, a PCB assembly, and a support as seen in FIG. 1. As shown in FIGS. 1 and 2, an LCD monitor 1 according to the present invention comprises a cover casing 3 forming an outer appearance thereof, an LCD assembly 5 and a PCB assembly 7 accommodated in the cover casing 3, and a support 10 for supporting the LCD assembly 5 and the PCB assembly 7.

The cover casing 3 comprises a front casing 20 and a rear casing 30 which are combined with or joined to each other, and which form a space therebetween for accommodating the assemblies (such as the LCD assembly 5, the PCB assembly 7, etc.). An opening 21 is provided in the front casing 20 for transmitting pictures displayed on an LCD panel 40 to the outside of the LCD monitor. A plurality of hooks 23 is provided on the circumference of the rear surface of the front casing 20 for combining or joining front casing 20 with the rear casing 30. A casing combining part 25 is provided in a lower part of the rear surface of the front casing 20 for combining or joining the front casing 20 with the rear casing 30 by means of screws 61. A female screw (not shown) is formed in the casing combining part 25. A plurality of stopping projections 27 is provided in the opposite side of the circumference of the front casing 20 for establishing an assembly position of the LCD assembly 5, and for preventing the LCD assembly 5 from moving out of the support 10. Further, a plurality of screw coupling parts 29 is provided in the circumference of the rear surface of the front casing 20 for combining or joining it with the support 10. A female screw part (not shown) is formed in the screw coupling part 29.

Air inflow slots 31 for conveying outside air into the interior of the cover casing 3, and terminal passing holes 39 for the connection of input terminals, are provided in the rear casing 30. A plurality of hook holes 33 is provided in the circumference of the rear casing 30 in correspondence to the hooks 23 of the front casing 20. A plurality of combining holes 35 is provided in the rear casing 30 in correspondence to the casing combining part 25, and the screws 61 pass through holes 35. Further, pressing projections 37 are provided in the opposite sides of the inside surface of the rear casing 30 for pressing the LCD assembly 5 against the front casing 20 by contact with the LCD assembly 5.

The LCD assembly comprises an LCD panel 40 on which pictures are displayed, and an LCD support frame 41 which is combined with or joined to the circumference of the LCD panel 40. Stopping grooves 47 are provided in the opposite sides of a lower part of the LCD support frame 41 in correspondence to the stopping projections 27 of the front casing 20. Further, pressing grooves 45 are formed in the opposite sides of a lower part of the LCD support frame 41 in correspondence to the pressing projections 37 of the rear casing 30.

The PCB assembly 7 comprises a PCB 51 and a plurality of components 53 provided on the PCB 51. A plurality of input ports 59 is provided in a certain area of the PCB assembly 7, corresponding to the terminal passing hole 39 of the rear casing 30, for connection to power input terminals and cable connecting terminals.

The support 10 comprises an LCD support part 11 covering at least a certain area of the LCD assembly 5, and a board accommodating part 13 integrated with the LCD support part 11 in one body and accommodating the PCB assembly 7.

Bent flange 14 is provided in the circumference of the LCD support part 11, and adjacent to the circumference of LCD assembly 5, for preventing the LCD assembly 5 from moving out of the support 10. Casing combining flaps 15 are provided beside the bent flange 14 and adjacent to screw coupling part 29 of the front casing 20. A screw passing hole 17 is provided in each of the casing combining flaps 15.

The bent flange 14 may be provided so as to entirely surround the circumference of the LCD assembly, or so as to partially surround the circumference of the LCD assembly 5, thereby preventing the LCD assembly 5 from moving out of the support 10.

The board accommodating part 13 projects outwardly from the board surface of the LCD support part 11 so as to accommodate the entire PCB assembly 7 therein. A port passing opening 19 is provided in a lower part of the board accommodating part 13 in correspondence to the input port 59 of the PCB assembly 7.

Figure 3:
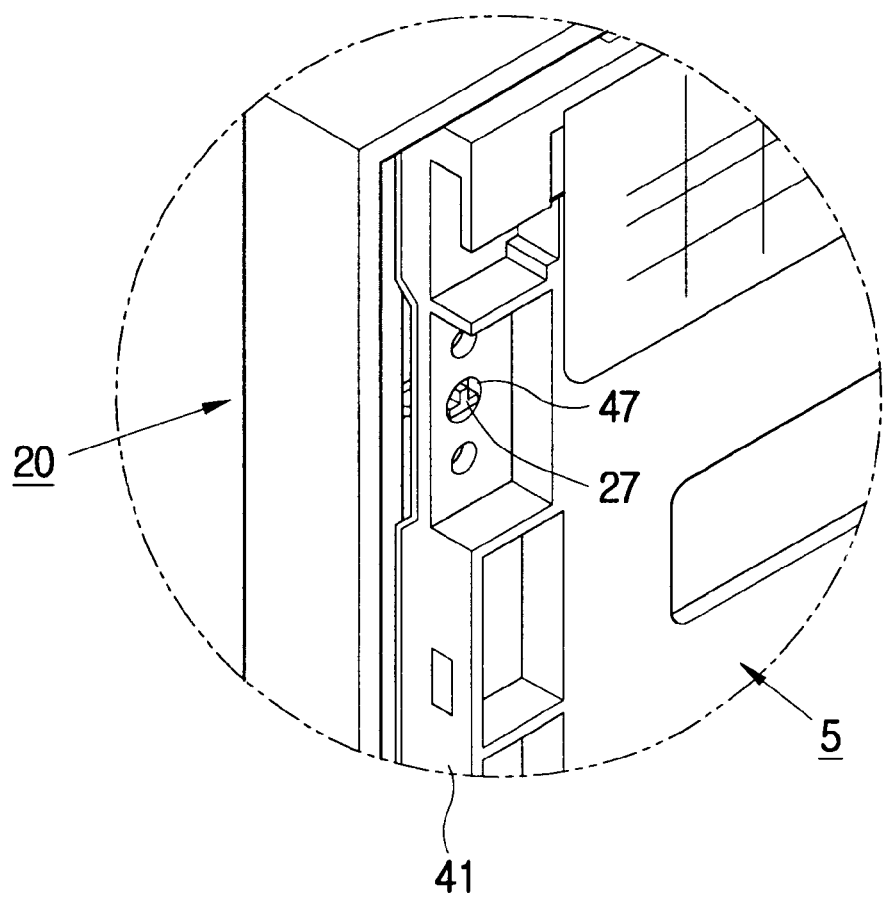
FIG. 3 is an enlargement view showing the coupling state of circles A and A' in FIG. 1.
Figure 4:
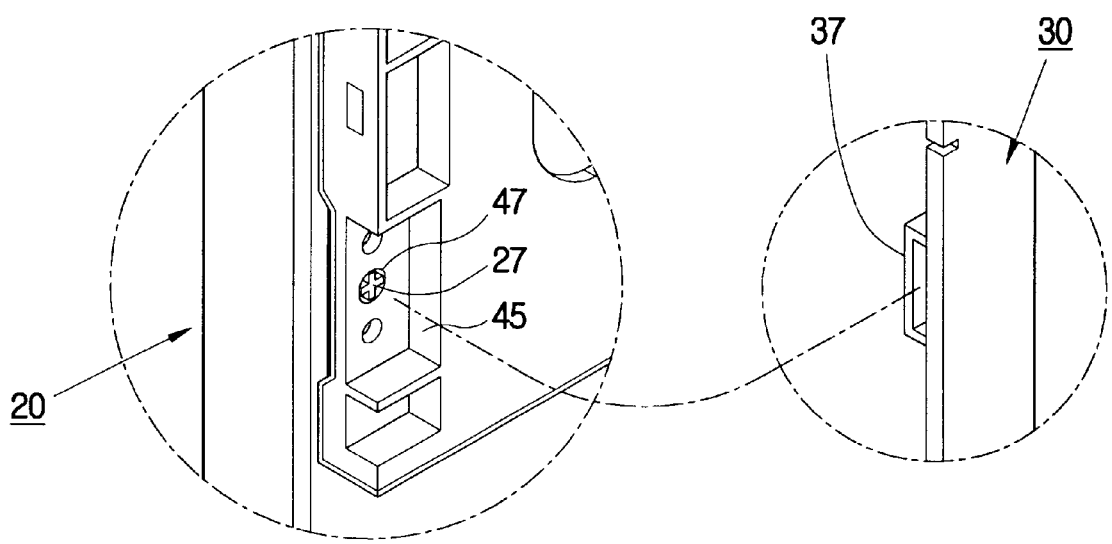
FIG. 4 is an enlargement view showing the coupling state of circles B and B' in FIG. 1.

With this configuration, the assembly process for the LCD monitor 1 according to the present invention will now be described. Firstly, the LCD assembly 5 is positioned at the rear surface of the front casing 20. The stopping grooves 47 provided in the opposite sides of the LCD assembly 5 are inserted into the stopping projections 27 provided in the front casing 20 to prevent the LCD assembly 5 from moving out of the support 10. In the latter regard, see FIGS. 3 and 4 which are enlarged views showing the coupling states of portions A and A' and portions B and B' of FIG. 1. The positions of the stopping grooves 47 and the stopping projections 27 may be reversed as necessary or desirable.

Then, the PCB assembly 7 is joined to the inside of the board accommodating part 13 of the support 10 using the screws 61. At this point, the input port 59 provided in the PCB assembly 7 is exposed to the outside of the support 10 through the port passing opening 19 (FIG. 2) of the board accommodating part 13. The PCB assembly 7 may be joined in advance to the inside of the board accommodating part 13 of the support 10.

After completing the assembly of the PCB assembly 7, the support 10 is disposed at the rear of the LCD assembly 5 which is positioned to the rear of the front casing 20 so that the top area of the LCD assembly 5 is partially accommodated in the LCD support part 11. At this point, the bent flange 14 of the LCD support part 11 contacts the top, left and right sides of the circumference of the LCD assembly 5 so as to prevent the LCD assembly 5 from moving out of the support 10. Then, the casing combining flaps 15 provided in the bent flange 14 of the LCD support part 11 contact the screw coupling parts 29 provided in the front casing 20. In this state, the screws 61 (FIG. 2) are inserted through the screw passing holes 17 of the casing combining flaps 15 and into the screw combining part 29 so that the support 10 accommodating the PCB assembly 7 is combined with or joined to the front casing 20, thereby pressing the LCD assembly 5 against the front casing 20. Through these steps, the combination of the LCD assembly 5 and the PCB assembly 7 is completed.

After the support 10 is combined with the front casing 20, the rear casing 30 is positioned at the rear of the support 10, and is pressed against the front casing 20. Then, the hook holes 33 provided in the circumference of the rear casing 30 are engaged with the hooks 23 provided in the front casing 20. The combining holes 35 provided in the rear casing 30 are then joined to the casing combining part 25 of the front casing 20. At this point, the input port 59 of the PCB assembly 7, which is exposed to the outside of the support 10, is also exposed to the outside of the rear casing 30 through the terminal passing opening 39 of the rear casing 30, and the pressing projections 37 provided in the rear casing 30 are engaged with the pressing grooves 45 of LCD assembly 5 (see FIG. 4 which is an enlarged view of portions B and B' of FIG. 1), thereby pressing the LCD assembly 5 against the front casing 20 and, at the same time, preventing the LCD assembly 5 from moving out of the support 10. In this state, the screws 61 (FIG. 2) are inserted through the combining holes 35 into the casing combining part 25, thereby completing the combination or joining of the cover casing 3, the LCD assembly 5, and the PCB assembly 7.

As described above, by causing the LCD support 10 to press the LCD assembly 5 against the front casing 20, and by providing integrated support with the board accommodating part 13 accommodating the PCB assembly 51 in one body, the number of the components for combining or joining the LCD assembly 5 with the PCB assembly 51 can be reduced, and the assembly steps can be simplified, thereby reducing the cost of production and improving the efficiency of production.

Figure 5:
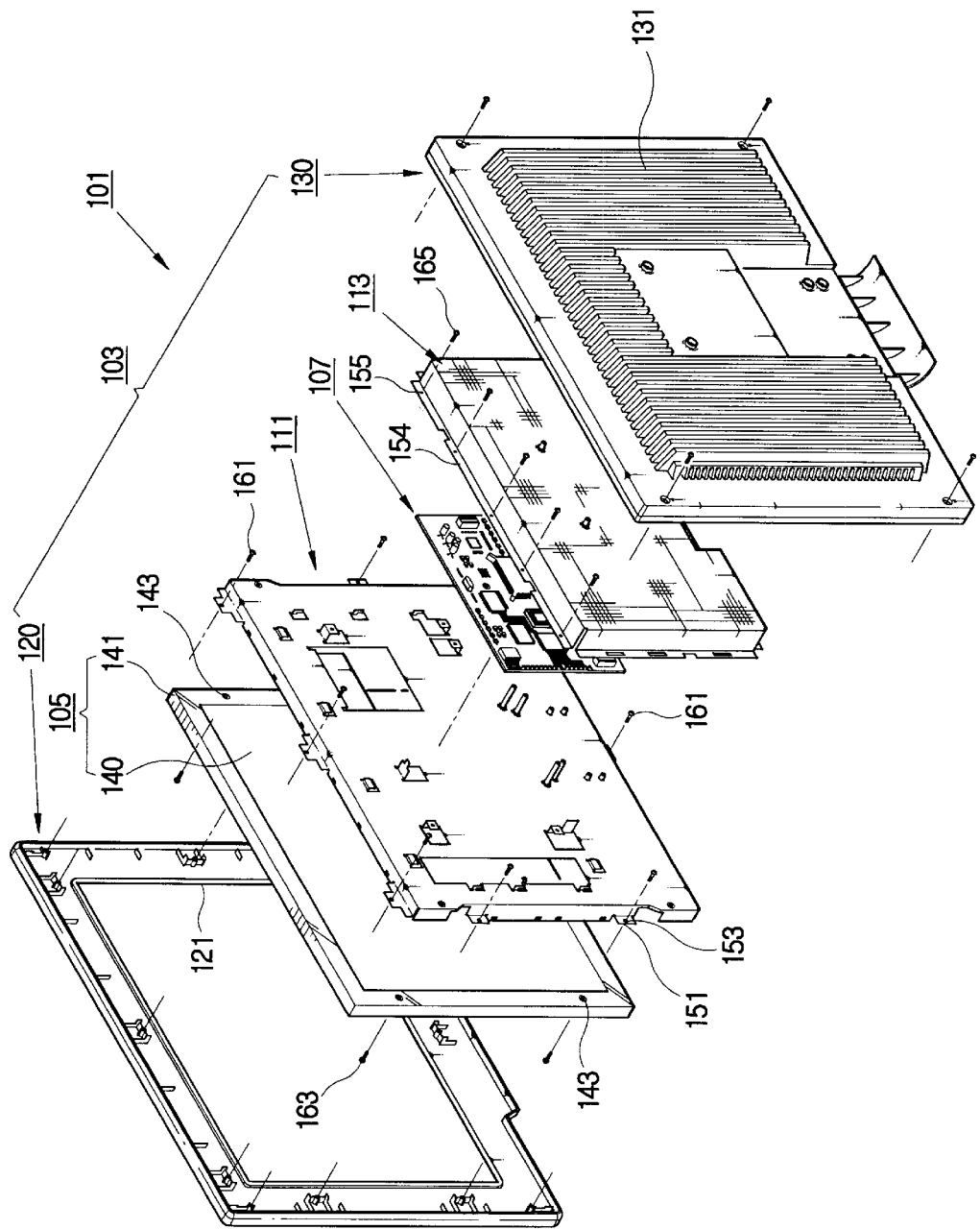
FIG. 5 is an exploded perspective view of a conventional LCD monitor.

FIG. 5 is an exploded perspective view of a conventional LCD monitor. As shown in FIG. 5, the conventional LCD monitor 101 comprises a cover casing 103 forming an outer appearance thereof, an LCD assembly 105 accommodated in the cover casing 103, and a PCB assembly 107 transmitting electric signals to the LCD assembly 105.

The cover casing 103 comprises a front casing 120 and a rear casing 130 which are combined with or joined to each other to form a space for accommodating the components, including the LCD assembly 105, the PCB assembly 107, etc. An opening 121 is provided in the front casing 120, through which opening pictures displayed on an LCD panel 140 are transmitted to the outside of the LCD monitor 101. Air inflow slots 131 and terminal accommodating holes (not shown) are provided in the rear casing 130.

The LCD assembly 105 comprises LCD panel 140 on which pictures are displayed, and an LCD support frame 141 which is combined with or joined to the circumference of the LCD panel 140. Screw combining holes 143 are provided at the left and right sides of the LCD support frame 141 for joining the LCD assembly 105 to a panel support 111.

The panel support 111 for fixing a position of the LCD assembly 105, and a PCB shield 113 for protecting the PCB assembly 107 and fixing a position of the PCB assembly 107, are accommodated between the front casing 120 and the rear casing 130.

The panel support 111 is made of a metal board and surrounds the rear surface and circumference of the LCD assembly 105. A plurality of combining flaps 151 is provided at the circumference of the panel support 111 for combination with or joining to the rear surface of the front casing 120. Screw passing holes 153 are formed in the combining flaps 151. The LCD assembly 105 is accommodated in the panel support 111, and is combined with or joined to the panel support 111 by screws 163. The panel support 111, combined with the LCD assembly 105, is further combined with or joined to the rear surface of the front casing 120 by a plurality of screws 161.

The PCB shield 113 is made of a metal board, and accommodates the PCB assembly 107. A plurality of flanges 154 is provided at the circumference of the PCB shield 113, in which screw passing holes 155 are formed. The PCB assembly 107 is fixed to the rear surface of the panel support 111 by screws 161. The PCB shield 113 is combined with or joined to the rear surface of the panel support 111 by a plurality of screws 165 so as to cover the PCB assembly 107.

However, because the panel support 111 and the PCB shield 113 of the conventional LCD monitor 101 are separately provided components, and are assembled using a plurality of screws 161, 163 and 165, the assembly process is complicated and the cost of production is increased.

While there have been illustrated and described what are considered to be preferred embodiments of the present invention, it will be understood by those skilled in the art that various changes and modifications may be made, and equivalents may be substituted for elements thereof, without departing from the true scope of the present invention. In addition, many modifications may

What is claimed is:

1. A liquid crystal display (LCD) monitor, comprising:
    a front casing;
    an LCD assembly joined to a rear of the front casing;
    a printed circuit board (PCB) assembly transmitting electrical signals to the LCD assembly;
    a support including an LCD support part joined to the front casing and disposed at a rear of the LCD assembly for pressing the LCD assembly against the front casing, and a board accommodating part integrally formed with the LCD support part in a single body for accommodating the PCB assembly therein; and
    a rear casing forming, with said front casing, a space for accommodating therein the LCD assembly, the PCB assembly and the support.

2. The LCD monitor according to claim 1, wherein the board accommodating part protrudes rearwardly inside the LCD support part.

3. The LCD monitor according to claim 2, further comprising at least one input port provided on a circumference of the PCB assembly; and
    wherein a port passing opening is formed at a certain area of the board accommodating part in correspondence to said at least one input port.

4. The LCD monitor according to claim 2, wherein the support further comprises a bent flange joined to at least one side of the LCD assembly for preventing the LCD assembly from moving out of the support.

5. The LCD monitor according to claim 4, wherein a plurality of casing combining flaps having screw passing holes formed therein are provided in the bent flange, and screw coupling parts are provided at a part of the front casing in correspondence to the casing combining flaps.

6. The LCD monitor according to claim 2, wherein at least one stopping projection is provided at one of a circumference of the LCD assembly and a circumference of the front casing, and projects toward another one of the circumference of the LCD assembly and the circumference of the front casing, and a stopping groove is provided at said another one of the circumference of the LCD assembly and the circumference of the front casing in correspondence to the stopping projection.

7. The LCD monitor according to claim 1, further comprising at least one input port provided on a circumference of the PCB assembly; and wherein a port passing opening is formed at a certain area of the board accommodating part in correspondence to said at least one input port.

8. The LCD monitor according to claim 1, wherein the support further comprises a bent flange joined to at least one side of the LCD assembly for preventing the LCD assembly from moving out of the support.

9. The LCD monitor according to claim 8, wherein a plurality of casing combining flaps having screw passing holes formed therein is provided in the bent flange, and screw coupling parts are provided at a part of the front casing in correspondence to the casing combining flaps.

10. The LCD monitor according to claim 1, wherein at least one stopping projection is provided at one of a circumference of the LCD assembly and a circumference of the front casing, and projects toward another one of the circumference of the LCD assembly and the circumference of the front casing, and a stopping groove is provided at said another one of the circumference of the LCD assembly and the circumference of the front casing in correspondence to the stopping projection.

11. The LCD monitor according to claim 1, further comprising:

at least one pressing projection joined to one of the LCD assembly and the rear casing for pressing the LCD assembly against the front casing.

12. A liquid crystal display (LCD) monitor, comprising:

a front casing;

an LCD assembly combined with a rear of the front casing;

a printed circuit board (PCB) assembly transmitting electrical signals to the LCD assembly;

a rear casing forming, with said front casing, a space for accommodating therein the LCD assembly and the PCB assembly; and at least one pressing projection joined to one of the LCD assembly and the rear casing for pressing the LCD assembly against the front casing.

13. The LCD monitor according to claim 12, wherein at least one stopping projection is provided at one of a circumference of the LCD assembly and a circumference of the front casing, and projects toward another one of the circumference of the LCD assembly and the circumference of the front casing, and a stopping groove is provided at said another one of the circumference of the LCD assembly and the circumference of the front casing in correspondence to the stopping projection.

14. The LCD monitor according to claim 12, further comprising a support including an LCD support part joined to the front casing and disposed at a rear of the LCD assembly for pressing the LCD assembly against the front casing, and a board accommodating part integrally formed with the LCD support part in a single body for accommodating the PCB assembly therein.

15. The LCD monitor according to claim 14, wherein the board accommodating part protrudes rearwardly inside the LCD support part.

16. The LCD monitor according to claim 14, further comprising at least one input port provided on a circumference of the PCB assembly; and wherein a port passing opening is formed at a certain area of the board accommodating part in correspondence to said at least one input port.

17. The LCD monitor according to claim 14, wherein the support further comprises a bent flange joined to at least one side of the LCD assembly for preventing the LCD assembly from moving out of the support.

18. The LCD monitor according to claim 14, wherein at least one stopping projection is provided at one of a circumference of the LCD assembly and a circumference of the front casing, and projects toward another one of the circumference of the LCD assembly and the circumference of the front casing, and a stopping groove is provided at said another one of the circumference of the LCD assembly and the circumference of the front casing in correspondence to the stopping projection.

19. The LCD monitor according to claim 1, wherein the board accommodating part accommodates the PCB assembly in its entirety.

20. The LCD monitor according to claim 12, wherein the board accommodating part accommodates the PCB assembly in its entirety.

* * * * *